United States Patent
Klemm et al.

(10) Patent No.: US 10,135,983 B2
(45) Date of Patent: Nov. 20, 2018

(54) ON-CALL SHARING OF SOCIAL MEDIA CONTEXT AND CONTENT

(71) Applicant: Avaya Inc., Santa Clara, CA (US)

(72) Inventors: Reinhard Klemm, Basking Ridge, NJ (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 398 days.

(21) Appl. No.: 14/951,030

(22) Filed: Nov. 24, 2015

(65) Prior Publication Data

US 2017/0149971 A1    May 25, 2017

(51) Int. Cl.
*H04M 3/51*    (2006.01)
*H04M 3/523*    (2006.01)
*G06Q 50/00*    (2012.01)

(52) U.S. Cl.
CPC .......... *H04M 3/5191* (2013.01); *G06Q 50/01* (2013.01); *H04M 3/5235* (2013.01)

(58) Field of Classification Search
CPC ... G06Q 50/01; H04M 3/5191; H04M 3/5235
USPC ....................... 379/265.01–265.14
See application file for complete search history.

(56) References Cited

U.S. PATENT DOCUMENTS

| | | | |
|---|---|---|---|
| 8,477,919 B2 * | 7/2013 | Sylvain | H04M 3/4285 379/201.01 |
| 8,634,543 B2 | 1/2014 | Flockhart et al. | |
| 8,879,697 B2 | 11/2014 | Klemm et al. | |
| 2010/0235218 A1 | 9/2010 | Erhart et al. | |
| 2010/0296417 A1 | 11/2010 | Steiner | |
| 2011/0125697 A1 | 5/2011 | Erhart et al. | |
| 2011/0125793 A1 | 5/2011 | Erhart et al. | |
| 2011/0125826 A1 | 5/2011 | Erhart et al. | |
| 2012/0148040 A1 * | 6/2012 | Desai | H04M 3/493 379/265.13 |
| 2012/0303659 A1 | 11/2012 | Erhart et al. | |
| 2014/0044246 A1 * | 2/2014 | Klemm | H04M 3/523 379/93.01 |
| 2014/0059126 A1 | 2/2014 | Klemm et al. | |
| 2014/0359008 A1 | 12/2014 | Finney et al. | |
| 2015/0006399 A1 | 1/2015 | Markwordt et al. | |
| 2015/0055772 A1 | 2/2015 | Klemm et al. | |
| 2015/0170152 A1 * | 6/2015 | Shaffer | G06Q 50/01 705/304 |
| 2016/0036973 A1 * | 2/2016 | Harasimiuk | H04L 51/32 379/265.13 |
| 2017/0098282 A1 * | 4/2017 | Klemm | G06Q 50/01 |

* cited by examiner

*Primary Examiner* — Harry S Hong
(74) *Attorney, Agent, or Firm* — Sheridan Ross P.C.

(57) ABSTRACT

Associating customers of a contact center with their social media presence may provide mutual benefits to the customer and contact center. For example, a business operating a contact center can receive information about their current and potential customers and customers can receive additional information, incentives, or other perks by allowing access to their social media profile. When a customer initially calls a contact center, they are provided with a code and asked to post the code on a page or other aspect of the company's social media presence. The social media identity of the customer can then be associated with the customer placing the call. The call center can then access additional information about the customer and respond accordingly.

20 Claims, 5 Drawing Sheets

ON-CALL SHARING OF SOCIAL MEDIA CONTEXT AND CONTENT

FIELD OF THE DISCLOSURE

The present disclosure is generally directed toward matching a node on a first electronic network to a node on a second electronic network.

BACKGROUND

Contact centers and companies have an interest in acquiring as much context as possible about the individuals calling the contact center. The caller context can aid in call routing, issue resolution, on-call marketing, and beyond. One valuable source of caller context is social media because a caller's social media activity and profiles provide insights into the caller's persona (e.g., name, age, gender, education, interests, hobbies, etc.) as well as the caller's potential value to the business. For example, a caller who posts about their experiences with flights on various airlines on social media reveals a lot about their travel frequency, destinations, and preferences, thus providing valuable insights to an airline. The value of this information is particularly high if this caller is not yet known to the called business.

SUMMARY

It is with respect to the above issues and other problems that the embodiments presented herein were contemplated.

Customers are used to providing personal information to companies for free in return for better service, discounts, useful marketing, etc. Many customers, therefore, would not be opposed to sharing their social media profiles and activities with a business whose contact center they are calling. Social media can act as a valuable add-on channel to a primary conversation channel between a customer and a contact center agent or the business at large. The value of the add-on channel can extend to both the customer and the business.

Embodiments disclosed herein provide an interactive voice response (IVR) adjunct that provides a code that can be posted thereby allowing the contact center to match the call/caller to a social media identity. This allows the sharing of social media information between a caller and a contact center.

The system and methods described are operable to provide an IVR adjunct that provides postable codes thereby allowing the contact center to match the call/caller to a social media identity and appropriately analyze posts and route calls.

In one embodiment, an IVR adjunct is disclosed facilitating the sharing of a customer's social media information between a customer and a contact center, such as via a series of steps, which may include the following:

1. The customer calls the contact center.
2. The IVR system responds with a series of prompts. The first IVR prompt consists of the following question: "To enhance our customer service to you, may we retrieve your XYZ username?" (where XYZ is one of a number of popular social networks).
3. If the customer agrees, the IVR adjunct generates a code (e.g., 12345) that is unique during a configured time interval, for example, 10 minutes.
4. The IVR system then asks the customer to post *12345* to XYZ and, optionally, include the reason for the call. Alternatively, the IVR system can encourage the use of a private message to the business instead of a publicly visible post. The IVR system may then play music on hold (MOH) or other on-hold presentation.
5. The adjunct monitors all social media posts in its XYZ channel and its private message inbox (e.g., Facebook page, Twitter feed, etc.) for a post or private message containing *12345*.
6. If no such post appears in a configured time interval, for example, 2 minutes, the IVR ends the MOH and re-prompts the customer or moves on to a traditional IVR menu.
7. If such a post from a user C appears, the IVR adjunct now has the customer's social media identity on XYZ and can retrieve the customer's social media activity and profile (elements).
8. If user C includes the reason for their call in the post containing *12345*, the IVR adjunct retrieves the reason from the post and routes the call to an appropriate agent.
9. If user C does not include the reason for their call in the post, the IVR ends the MOH and continues with a traditional IVR menu.
10. In both steps 8 and 9, the IVR adjunct analyzes user C's social media activities and profile (elements) and uses the analysis results in the routing of the call as well as in agent scripting and agent screenpops.
11. The IVR adjunct stores the tuple (user C's phone number, user C's XYZ identity) in a customer resource management (CRM) database. The next time user C calls the contact center, user C's XYZ identity is known and the step requiring the generation and posting of the code (e.g., "12345" as above) can be skipped. The customer, however, can still post the reason for the communication, which will be used in the routing, agent scripting, and screenpop for that call.

In another embodiment, the IVR adjunct is specifically absent functionality to directly request the user to provide their social media identity. Directly querying the user is likely to be counterproductive due to a high likelihood of accidental or deliberate misinformation on the part of the customer, in part, as certain social networks do not provide their users with easy to remember identities.

In one embodiment, a system is disclosed, comprising: a communication interface to a network; a processor, upon accessing a communication from a customer via the network interface: prompts the customer to provide indicia on a social media website, monitors the social media website for the indicia, and upon identification of the indicia posted by a poster on the social media website, determines an interaction with the customer in accordance with a social media element of the poster.

In another embodiment, a method is disclosed, comprising: accessing a communication from a customer via the network interface; prompting the customer to provide indicia on a social media website; monitoring the social media website for the indicia; and upon identifying the indicia posted by a poster on the social media website, determining an interaction with the customer in accordance with a social media element of the poster.

In another embodiment, a means for associating a customer of a call with a social media profile is disclosed, comprising: accessing a communication from a customer via the network interface; prompting the customer to provide indicia on a social media website; monitoring the social media website for the indicia; and upon identifying the indicia posted by a poster on the social media website, determining an interaction with the customer in accordance with a social media element of the poster.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation, or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
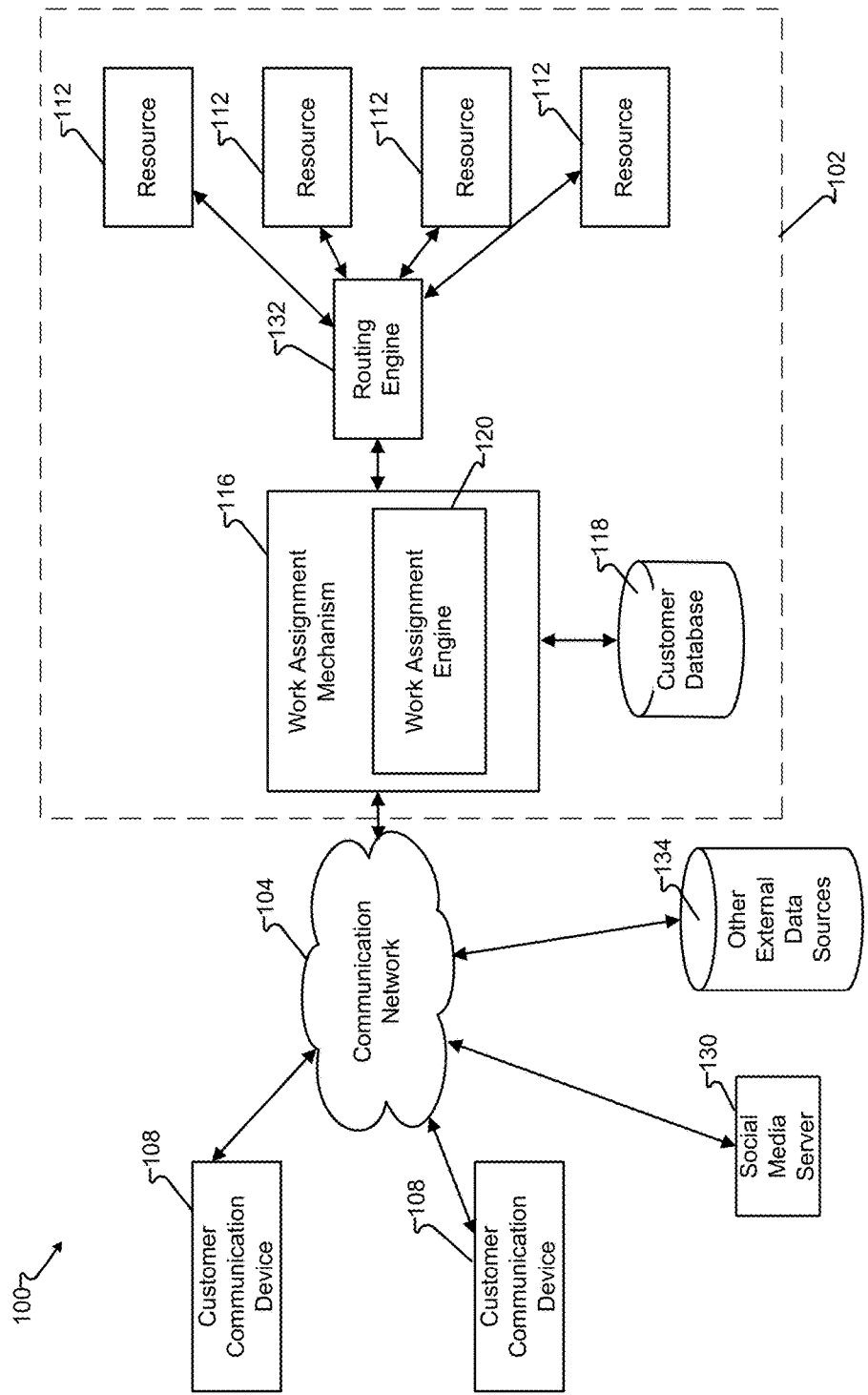
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 112, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus or third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication at which point the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In other embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from the resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
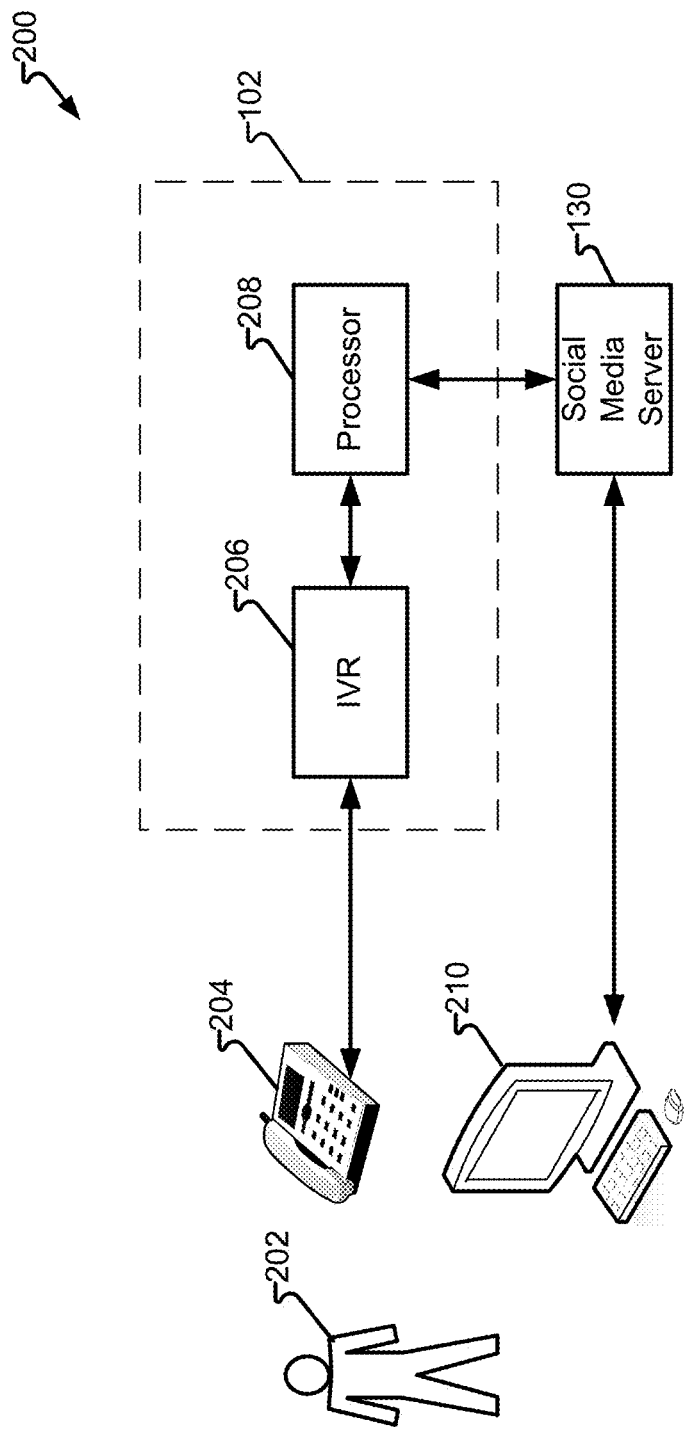
FIG. 2 depicts a second system in accordance with embodiments of the present disclosure.

FIG. 2 depicts system 200 in accordance with embodiments of the present disclosure. In one embodiment, system 200 comprises contact center 102. To avoid unnecessarily complicating the figure, FIG. 2 illustrates a portion of the components of contact center 102 provided with respect to FIG. 1. In particular, interactive voice response (IVR) 206 and a processor 208. IVR 206 and processor 208 may comprise automated resource 112 and/or a portion comprising or comprised by work assignment mechanism 116, work assignment engine 120, and/or routing engine 132.

In another embodiment, customer 202 places a call using telephone 204. A resource 112 accepts the call, such as when resource 112 is embodied by IVR 206. Contact center 102 may have certain information associated with customer 202, such as information provided by customer 202 directly to IVR 206, caller identification (e.g., CallerID), etc. accessing customer database 118 and/or other data sources. However, customer 202 may have a social media identity that is initially unknown to contact center 102. Customer 202 may be an individual, or collection of individuals (e.g., group, organization, business enterprise, etc.) who initiates or receives a communication to or from contact center 102. The reason for the communication may be to make a purchase, inquiry, marketing, or other and customer 202 may be a customer of contact center 102, a user of contact center 102, and/or a potential customer of contact center 102.

In other embodiments, telephone 204 comprises, is comprised by, or integrated with other forms of customer communication device 108. For example telephone 204 may be an endpoint for SMS texts, text-chat, email, video chat, or other forms of communication. Accordingly, telephone 204 and computing device 210 may be the same customer communication device 108. However, merely as an aid to clarity, the embodiment herein illustrates the use of telephone 204 to provide a voice-only call and computing device 210 is utilized for accessing social media server 130.

Customer 202 is prompted by IVR 206, which may be further directed by processor 208, to provide indicia on a social media website. Customer 202, utilizing computing device 210, accesses a social media server 130, such as via a webpage or other interface associated with social media server 130, and provides the indicia. Processor 208 monitors and/or receives updates from social media server 130, such as via application programming interface (API) or other communication protocol. Processor 208, upon detecting the indicia, may then access the profile of the poster and associate the poster with customer 202. Processor 208 may then analyze content of social media server 130 associated with customer 202 to determine relevant aspects of customer 202 and/or identify a candidate reason for customer 202 to the place the call.

Figure 3:
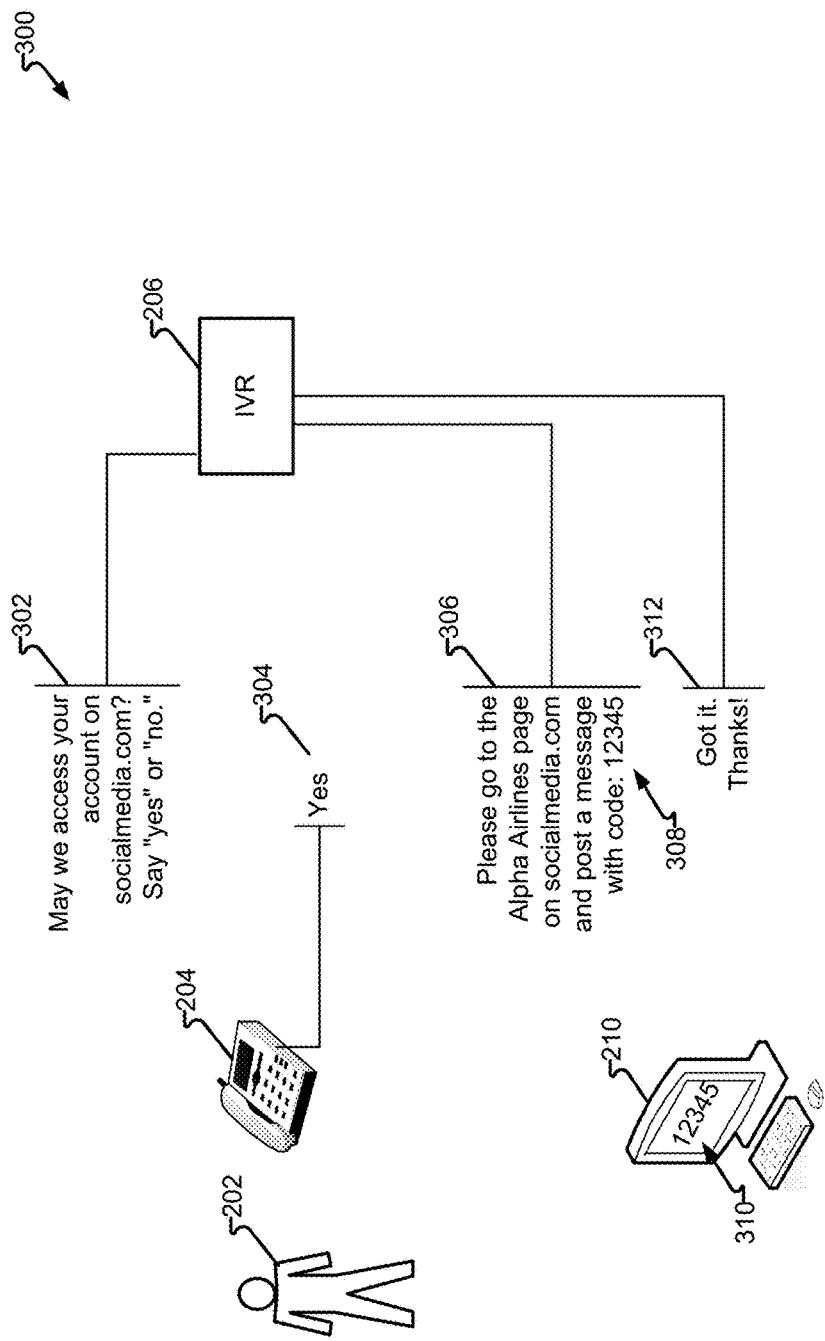
FIG. 3 depicts an exchange in accordance with embodiments of the present disclosure.

FIG. 3 depicts exchange 300 in accordance with embodiments of the present disclosure. In one embodiment, IVR 206 provides audio prompt 302 asking for permission to identify customer 202 on a specific social media website (socialmedia.com). Customer 202, utilizing telephone 204, provides response 304 indicating a granting of permission. Customer 202 may alternatively respond in the negative or not at all, which may be treated as a refusal to grant permission or a lack of presence on the specific social media website and/or any social media website.

Upon receiving permission, IVR 206 presents prompt 306 comprising indicia 308. Indicia 308 is accessed and/or generated, such as by processor 208, to uniquely identify a poster on a social media website. Customer 202 accesses the social media website via computing device 210 and provides entered indicia 310. IVR 206 may provide response 312 indicating that entered indicia 310 has been received on the social media website. In another embodiment, indicia 308 may be determined by customer 202. For example, IVR 206 may prompt customer 202 to enter indicia 308 (e.g., "please select a key word, phrase, numeric sequence, etc. for entry into social media website.). Customer 202 then responds to IVR 206 (e.g., "I will enter '5555.'"). Customer 202 may then enter indicia 310 via computing device 210 and for detection by processor 208. As a further embodiment, processor 210 and/or IVR 206 may validate a user selected indicia is unique and, if not, prompt the customer to select a different indicia 308.

While it may be preferable to make indicia 308 with as few characters as possible, to facilitate ease of use by customer 202, fewer characters increases the frequency of reuse (e.g., using the same indicia for a subsequent customer 202). In one embodiment, indicia 308 is determined as being unique for a predetermined period of time. For example, it may be known that all past customers, when prompted to enter the indicia, do so within three minutes. Therefore, the volume of customers over a three minute period may be used to determine the period for which any one indicia is to be associated with a specific customer 202. For example, three numeric digits would remain unique for one thousand customers over a three minute period. The indicia may incorporate additional characters to provide further assurance of uniqueness and/or error checking. In addition to numeric characters, other characters (e.g., letters, symbols, emoji, etc.) may be utilized as, or as a portion of, indicia 308 and subsequently entered as indicia 310.

In another embodiment, IVR 206 may be an automated text chat engine, email engine, or other automated response operable to provide indicia 308 to customer 202 via a customer communication device 108 configured to receive messages provided by the text, email, or other non-voice response means. In yet another embodiment, indicia 308 is provided by resource 112 as a human agent. In another embodiment, prompt 302 may be provided with a number of social media websites or without identifying any particular social media website. Customer 202 may then select any social media website and social media server 130 is one of a plurality of social media websites monitored for entered indicia 310. Entered indicia 310 may be provided via a private message (e.g., private instant message, chat, etc.) or a publicly accessible post, wherein other users of the social media website may have access to a post, message, "Tweet," or other message comprising entered indicia 310.

Figure 4:
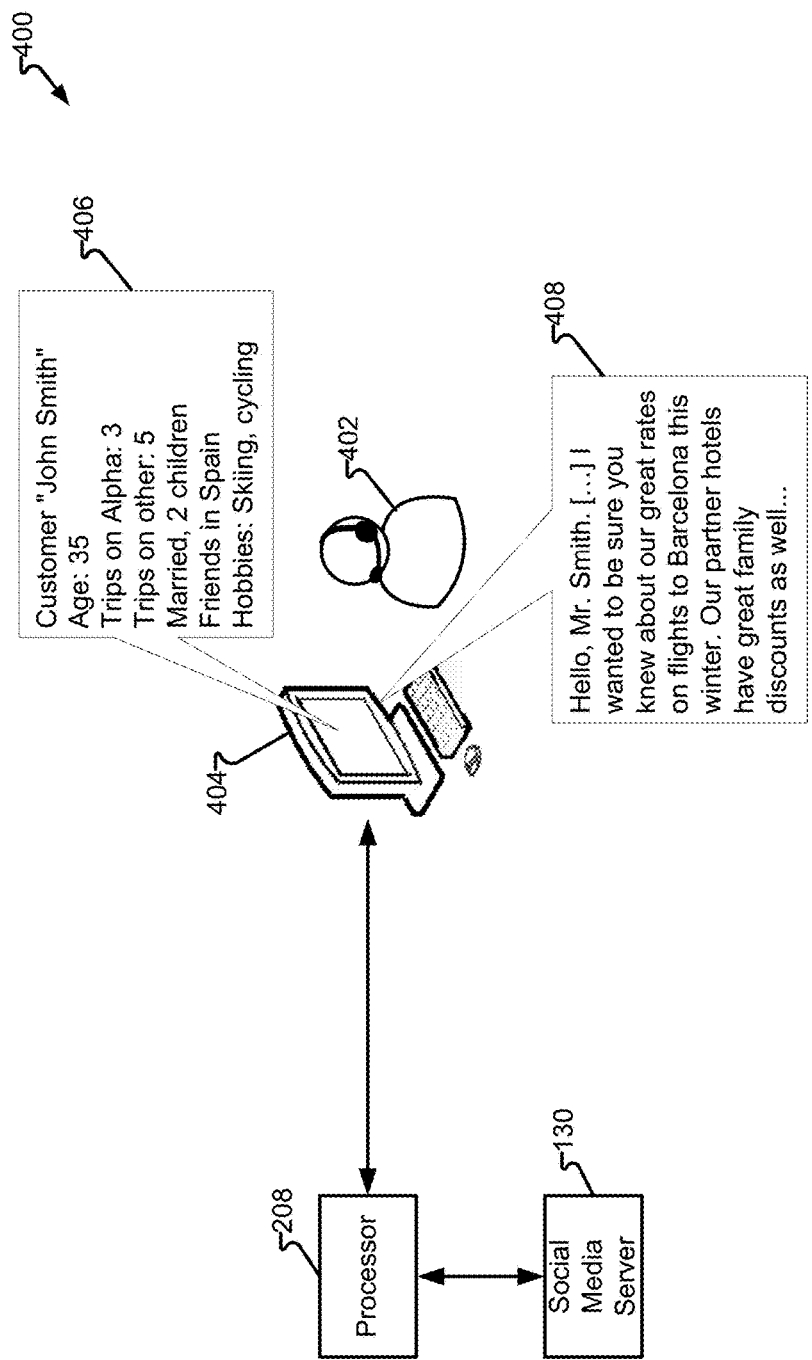
FIG. 4 depicts a contact center portion in accordance with embodiments of the present disclosure.

FIG. 4 depicts contact center portion 400 in accordance with embodiments of the present disclosure. In one embodiment, a user, such as customer 202, has provided the indicia to social media server 130. Social media server 130 provides updates and/or responses to queries from processor 208 to determine the social media elements (e.g., profile elements, likes, shares, endorsements, relationships, interests, demographic data, etc.) from social media server 130.

In one embodiment, processor 208 provides interaction prompt 406 to agent 402. Agent 402 may be one of resources 112 when embodied as a human agent. In another embodiment agent 402 may be an automated resource 112. Agent 402 may receive interaction prompt 406 providing information gathered from social media server 130. Interaction prompt 406 may provide background information on customer 202 and/or other information that may be utilized by agent 402 in the interaction with customer 202. In another embodiment, script 408 provided to agent 402 may be expressly customized to customer 202 based upon social media elements obtained from social media server 130. For example, customer 202 may place a call to speak with agent 402 regarding air travel. Social media server 130 may determine that the customer has an interest in Spain as well as in skiing and provide that information directly, such as via interaction prompt 406, or when interaction prompt is integrated into script 408.

Figure 5:
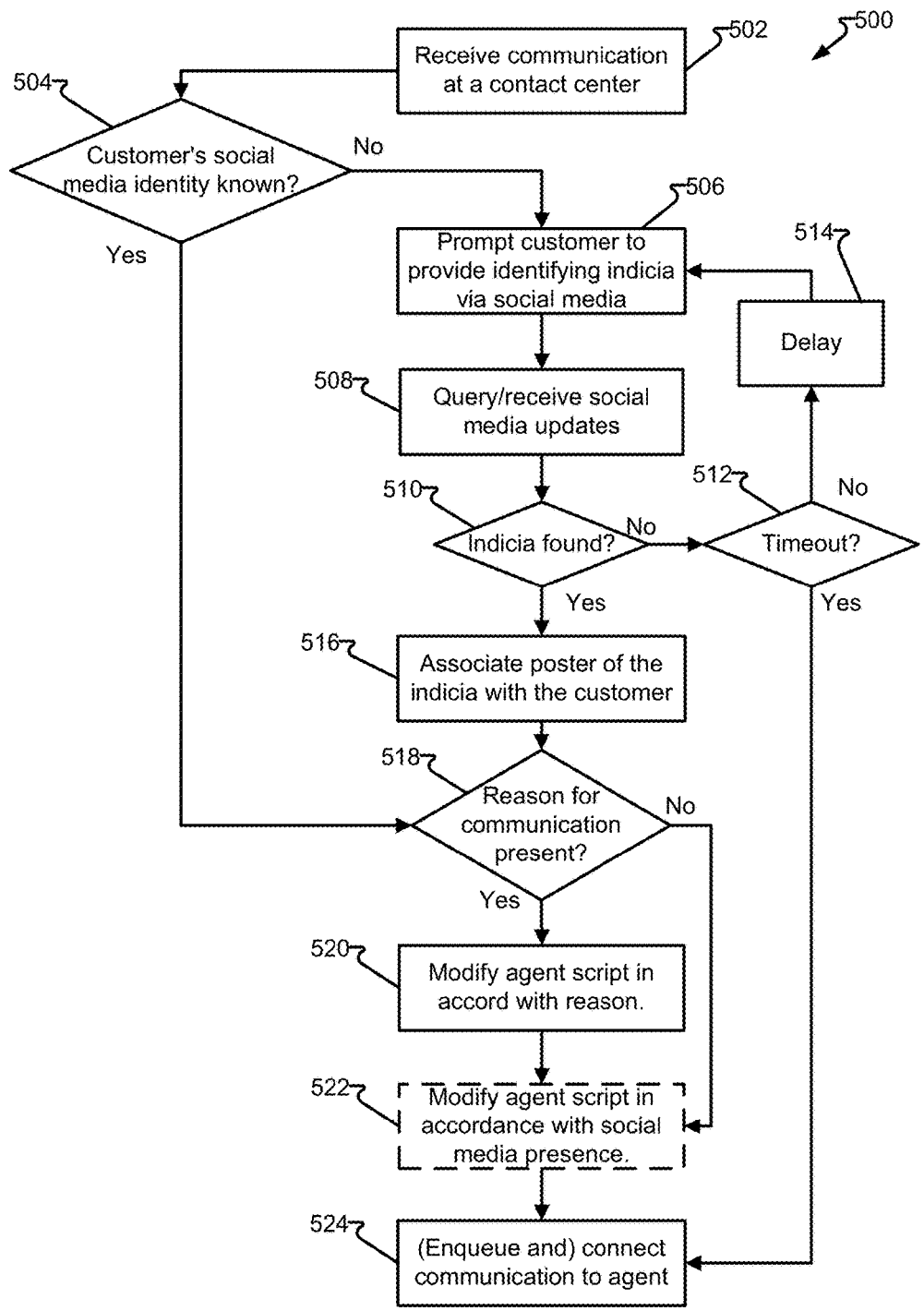
FIG. 5 depicts a process in accordance with embodiments of the present disclosure.

FIG. 5 depicts process 500 in accordance with embodiments of the present disclosure. In one embodiment, process 500 begins at step 502 wherein the communication is received at a contact center. Step 504 determines if the customer's social media identity is known. If determined in the negative, process 500 continues to step 506. If determined in the affirmative process 500 may continue to step 518. It should be appreciated that in other embodiments the communication is placed by the contact center, such as via a callback mechanism, in response to a query or other contact medium. The communication may be voice call. In other embodiments, the communication may be any communication type, such as text, email, video chat, or other form of communication wherein the identity of the customer 202 on a social media website is initially unknown.

Step 506 provides a prompt during the communication for the customer to enter identifying indicia via a social media channel. The prompt may be specific to a particular social media website, plurality of social media websites, or without identification of a particular social media website, such as when contact center 102 has monitoring abilities of enough social media websites to reasonably determine that the customer will pick a social media website to which contact center 102 may receive information therefrom associated with the indicia.

Step 508 queries and/or receives social media updates from one or more social media websites and/or servers. Step 510 determines if the indicia has been found. If step 510 is determined in the negative, process 500 may continue to step 512; otherwise, process 500 may continue to step 516. Step 512 determines if the timeout condition has occurred and, if yes, process 500 may proceed directly to step 524. If step 512 is determined in the negative, delay 514 may be executed following which step 506 may be re-executed to re-prompt the customer to provide the indicia on the social media website. Alternatively step 506 may prompt for a different or alternative social media website. After which step 508 and 510 may be repeated until such time as steps 510 or 512 are determined in the affirmative. It should be appreciated that step 508 may be substantially perpetual and begin and/or and execute at times other than between steps 506 and 510. For example, step 508 may be continually executing to receive indicia from a plurality of customers and subsequently match the indicia, and their associated social media profile, with a particular customer.

Once step 510 has been determined in the affirmative, processing continues to step 516 wherein the poster of the indicia is associated with the customer, such as customer 202. Step 516 may determine that the customer is associated with a plurality of people (e.g., couple, family, organization, etc.) or an entity (e.g., business, club, etc.) based upon the identity of the social media profile associated with the posting of the indicia. Next, step 518 may determine if a reason for the call is present as a social media element associated with the poster of the indicia. If yes, step 520 may modify an interaction, such as agent script 408, in accord with the reason and/or route the call to a particular agent based upon the reason. If step 518 is determined in the negative, or in addition to step 520, step 522 may modify the interaction in accordance with a social media element associated with the poster of the indicia. In another embodiment, step 520 and/or step 522 of the interaction may simply present social media elements to an agent for their use as they determine appropriate. Step 524 then enqueues the call and ultimately connects the call to a resource 112, such as a human agent. Alternatively, the call may be already engaged by the agent and the interaction may be presented via a pop-up window, whisper channel communication, or other means to provide the interaction to cue, or instruct (e.g., script) the agent engaged in the call.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

While illustrative embodiments of the disclosure have been described in detail herein, it is to be understood that the inventive concepts may be otherwise variously embodied and employed and that the appended claims are intended to be construed to include such variations, except as limited by the prior art.

What is claimed is:

1. A system, comprising:
a first communication interface to a first network; and;
a processor communicatively attached to the first communication interface and the processor, upon accessing a communication from a customer via the first communication interface:
selects an indicia;
prompts the customer to provide the indicia on a second network comprising a social media website,
monitors the social media website for the indicia;
upon identification of the indicia posted by a poster on the social media website, accesses a social media element of the poster;
associates the poster with the customer;
analyzes the social media element;

determines an interaction with the customer in accordance with the social media element of the poster; and provides the communication to the customer, via the first communication interface, wherein the communication is modified to comprise the interaction.

2. The system of claim 1, wherein:

the social media website comprises a plurality of social media websites and the processor monitors the plurality of social media websites for the indicia; and the processor, upon identifying the indicia on one of the plurality of social media websites, determines the interaction with the customer in accordance with the social media element of the poster on the one of the plurality of social media websites.

3. The system of claim 1, wherein the processor, upon failing to identify the indicia on the social media website for a first previously determined period of time, repeats the prompt of the customer to provide indicia on the social media website.

4. The system of claim 3, wherein the processor, upon failing to identify the indicia on the social media website for a second previously determined period of time, omits the determining of the interaction with the customer in accordance with the social media element of the poster.

5. The system of claim 1, wherein the social media element comprises an indicator of a reason for the call.

6. The system of claim 5, wherein the processor determines the interaction in accordance with the reason.

7. The system of claim 1, wherein the processor determines that the customer has been previously associated with the poster, the processor omits the prompting of the customer and monitoring for the indicia.

8. The system of claim 1, wherein the processor determines the interaction to comprise a popup screen having thereon a cue selected in accordance with the social media element to be presented to a human agent while the human agent is engaged in the call with the customer.

9. The system of claim 1, wherein the processor generates the indicia.

10. The system of claim 9, wherein the processor generates the indicia to be unique during a previously determined period of time, determined, in part, by the likelihood of the customer being engaged in providing the indicia on the social media website.

11. The system of claim 1, wherein the customer determines the indicia.

12. A method, comprising:

accessing a communication from a customer via a first communication interface to a first network;

selecting an indicia;

prompting the customer to provide the indicia on a second network comprising a social media website;

monitoring the social media website for the indicia;

upon identifying the indicia posted by a poster on the social media web site, accessing a social media element of the poster;

associating the poster with the customer;

analyzing the social media element;

determining an interaction with the customer in accordance with the social media element of the poster; and providing the communication to the customer, via the first communication interface, wherein the communication is modified to comprise the interaction.

13. The method of claim 12, further comprising:

determining the indicia has not been detected on the social media website for a first previously determined period of time; and repeating the prompting step to prompt the customer to provide indicia on a social media website.

14. The method of claim 13, further comprising:

determining the indicia has not been detected on the social media website for a second previously determined period of time; and omitting the determining of the interaction with the customer in accordance with the social media element of the poster.

15. The method of claim 12, wherein the social media element comprises an indicator of a reason for the call.

16. The method of claim 15, wherein the interaction is determined in accordance with the reason.

17. A system, comprising:

means to access a communication from a customer via a network interface to a first network;

means to select an indicia;

means to prompt the customer to provide the indicia on a second network comprising a social media website;

means to monitor the social media website for the indicia;

upon identifying the indicia posted by a poster on the social media website, means for accessing a social media element of the poster;

means to associate the poster with the customer;

means to analyze the social media element;

means to determined an interaction with the customer in accordance with the social media element of the poster; and means to provide the communication to the customer, via the network interface, wherein the communication is modified to comprise the interaction.

18. The system of claim 17, further comprising means to determine that the customer has been previously been associated with the poster and omitting the prompting of the customer and monitoring for the indicia.

19. The system of claim 17, wherein the means to select the indicia comprise means to generate the indicia.

20. The system of claim 16, further comprising means to present an agent with a datum of the customer selected in accordance with the social media element.

* * * * *

UNITED STATES PATENT AND TRADEMARK OFFICE
CERTIFICATE OF CORRECTION

PATENT NO. : 10,135,983 B2
APPLICATION NO. : 14/951030
DATED : November 20, 2018
INVENTOR(S) : Reinhard Klemm and David Skiba It is certified that error appears in the above-identified patent and that said Letters Patent is hereby corrected as shown below:

In the Claims

At Column 14, Line 40, please delete "determined" and replace it with --determine-- therein.

Signed and Sealed this
Nineteenth Day of February, 2019

Andrei Iancu
*Director of the United States Patent and Trademark Office*